(12) United States Patent
Byman et al.

(10) Patent No.: US 10,743,083 B2
(45) Date of Patent: Aug. 11, 2020

(54) COLLABORATIVE MULTI-MEDIA, MULTI-CHANNEL COGNITIVE VISUAL ANALYTICS RATIONALE AUTHORING AND PLAYBACK

(71) Applicant: International Business Machines Corporation, Armonk, NY (US)

(72) Inventors: David H. Byman, Malden, MA (US); Nathaniel Mills, Coventry, CT (US)

(73) Assignee: International Business Machines Corporation, Armonk, NY (US)

(*) Notice: Subject to any disclaimer, the term of this patent is extended or adjusted under 35 U.S.C. 154(b) by 456 days.

(21) Appl. No.: 14/976,622

(22) Filed: Dec. 21, 2015

(65) Prior Publication Data
US 2017/0180458 A1 Jun. 22, 2017

(51) Int. Cl.
| | | |
|---|---|---|
| G06F 15/16 | (2006.01) | |
| H04N 21/6587 | (2011.01) | |
| H04N 21/61 | (2011.01) | |
| H04N 21/24 | (2011.01) | |
| H04N 21/239 | (2011.01) | |

(52) U.S. Cl.
CPC ..... *H04N 21/6587* (2013.01); *H04N 21/2393* (2013.01); *H04N 21/2408* (2013.01); *H04N 21/6175* (2013.01)

(58) Field of Classification Search
CPC .......................... H04L 67/22; G06F 3/04812
See application file for complete search history.

(56) References Cited

U.S. PATENT DOCUMENTS

| | | | | |
|---|---|---|---|---|
| 5,475,835 A | | 12/1995 | Hickey | |
| 7,379,848 B2* | | 5/2008 | Yu | G06Q 10/10 |
| | | | | 702/186 |
| 8,751,970 B2* | | 6/2014 | Hinckley | G06F 3/0416 |
| | | | | 345/173 |
| 9,298,362 B2* | | 3/2016 | Lucero | H04N 21/4788 |

(Continued)

OTHER PUBLICATIONS

Stack Overflow, "Send responses to all clients except sender (Socket. io)", http://stackoverflow.com/questions/10058226/send-response-to-all-clients-except-sender-socket-io, Last Visited on Dec. 21, 2015, pp. 1-4.

(Continued)

*Primary Examiner* — Umar Cheema
*Assistant Examiner* — Tesfu N Mekonen
(74) *Attorney, Agent, or Firm* — Fleit Intellectual Property Law; Donna Flores

(57) ABSTRACT

Various embodiments provide a multi-channel collaborative visual analytics (CVA) system, method and computer program product for coordinating collaborative data exploration. The system comprises a central CVA server and a plurality of client devices. The CVA server has a plurality of local channels and a global channel. Each client device is coupled to one or more local channels of the central CVA server by one or more WebSockets and communicates state change event data of a distributed-web-connected application to the central CVA server. The central CVA server manages both real-time delivery and recorded playback of the state change events for the plurality of client devices. The CVA system further comprises a persistent store that stores the state change events from the plurality of client devices for deferred playback.

15 Claims, 21 Drawing Sheets

(56) References Cited

U.S. PATENT DOCUMENTS

| | | | |
|---|---|---|---|
| 9,633,358 B2 * | 4/2017 | Kolowich | G06Q 30/0201 |
| 2014/0280590 A1 * | 9/2014 | Nemer | G06Q 30/0214 |
| | | | 709/204 |
| 2015/0032876 A1 * | 1/2015 | Staunton-Lambert | ........................ |
| | | | H04L 41/509 |
| | | | 709/224 |
| 2015/0039694 A1 * | 2/2015 | Yoon | H04L 12/1813 |
| | | | 709/204 |
| 2015/0188971 A1 * | 7/2015 | Yoon | H04L 67/20 |
| | | | 709/219 |
| 2017/0060812 A1 * | 3/2017 | Williams | G06F 17/211 |
| 2017/0195374 A1 * | 7/2017 | Vu | H04L 65/403 |

OTHER PUBLICATIONS

Lunzer, A., "Lightweight Provenance-Driven Exploration", Nov. 2014, pp. 1-2.

Yuri da Silva Franco, R., et al., "PRISMA-MDE—Distributed and Scalable Environment for Multiple Views of Data Coordinates", Jul. 2012, pp. 1-6.

* cited by examiner

Client 1: Nat
Filter for North America is applied and screen changes

602

Client 2: Mills
Screen changes due to filter for North America by Client 1

602

Client 1: Nat
Nothing changes on this client – the data filter for North America is still in play for both clients.

Client 2: Mills
Now shows different Visual Analytic (Risk Clusters)

Client 1: Nat

400

Client 2: Mills

500

Client 1: Nat

1602

400

Client 2: Mills

1702

500

Client 1: Nat
While remaining locked, Client 1 learns a change has occurred, enabling the "resync" button

1902

Client 2: Mills
The new filter is applied to Client 2 but not to Client 1

COLLABORATIVE MULTI-MEDIA, MULTI-CHANNEL COGNITIVE VISUAL ANALYTICS RATIONALE AUTHORING AND PLAYBACK

BACKGROUND

The present disclosure generally relates to multi-channel visual presentation, and more particularly relates to a system for collaborative multi-media, multi-channel cognitive visual analytics, rationale, authoring and playback.

Exploring highly related, sparsely populated data using visual analytics involves coordinated displays with large amounts of screen real estate in order to show multiple perspectives of shared and filtered content. The exploration session is extended across the cloud with the ability to engage as a shared view participant during collaborative exploration or to disengage and fork the exploration process and later reengage with collaborators to share results. During exploration, the choices made to navigate between visual analytics, filter and select data, and/or configure displays to highlight insights are recorded. Capturing and documenting these choices and insights helps provide the rationale for the exploration session so other collaborators can understand why certain decisions were made and what was discovered. Current systems capture provenance, display content in multiple display environments (MDEs), or filter data, but have been implemented as disparate solutions focusing on empowering the exploratory process. However, there is no an integrated system that empowers users to collaborate during the exploration session and also edit, augment and rearrange the recorded stages of the collaborative exploration for playback in an MDE to communicate the rationale leading to insights so others less educated in the art of visual/data analytics can understand and benefit from the exploration session results.

BRIEF SUMMARY

In one embodiment, a multi-channel collaborative visual analytics (CVA) system for coordinating collaborative data exploration is disclosed. The multi-channel CVA system comprises a central CVA server and a plurality of client devices. The central CVA server includes a plurality of local channels and a global channel. Each client device is coupled to one or more local channels of the central CVA server by one or more WebSockets and communicates state change event data of a distributed-web-connected application to the central CVA server. The central CVA server manages both real-time delivery and recorded playback of the state change events for the plurality of client devices.

In another embodiment, a method for coordinating collaborative data exploration is disclosed. The method comprises receiving, at a central collaborative visual analytics (CVA) server, state change event data of a distributed-web-connected application from at least one client device of a plurality of client devices connected to the CVA server via one or more local channels using one or more WebSockets. The method further comprises storing the state change event data on a persistent store for deferred playback and communicating the state change event data to at least one other client device of the plurality of client devices.

In yet another embodiment, a computer program product for coordinating collaborative data exploration is disclosed. The computer program product comprises a storage medium readable by a processing circuit and storing instructions for execution by the processing circuit for performing a method. The method comprises receiving, at a central collaborative visual analytics (CVA) server, state change event data of a distributed-web-connected application from at least one client device of a plurality of client devices connected to the CVA server via one or more local channels using one or more WebSockets. The method further comprises storing the state change event data on a persistent store for deferred playback and communicating the state change event data to at least one other client device of the plurality of client devices.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

In this disclosure, a multi-channel Collaborative Visual Analytics (CVA) system is provided for recording, editing, and playing back exploratory visual and data analytic sessions of web-connected applications in use by one or more users to enable exposure of rationale and insights to affect understanding by audiences that may not be educated in visual/data analytic exploration. The system provides a multi-user, collaborative system capable of recording and playing back exploratory visual analysis sessions in a multi-display environment (MDE) using a full duplex, publish/subscribe multi-channel communication facility capable of running through firewalls using WebSockets. Note the terms "WebSocket" and "socket" are used interchangeably herein. The applications use events to manage changes in state. The system allows recorded events to be edited, augmented, and rearranged to tell a story about or communicate rationale for the exploratory session in an MDE during playback.

The system supports both synchronous collaboration using real-time event delivery, or asynchronous collaboration using deferred event delivery. It is assumed to defer delivery that events are being recorded and can later be played back and recorded events can be forked and later abandoned (e.g., resyncing with the original event stream) or adopted (e.g., allowing others to become synchronized with a different fork).

Displays in the system are updated based on state changing events, for example, view perspective or other attributes (e.g., size, color, scale). The system allows directed events between collaborators to alter what the other sees, for example, either changing the view, or the data, or both. The events can be altered and replayed to drive application changes automatically, for example, when replaying a game to assess strategy, the playback may be augmented with commentary about the players moves.

Operating Environment

Figure 1:
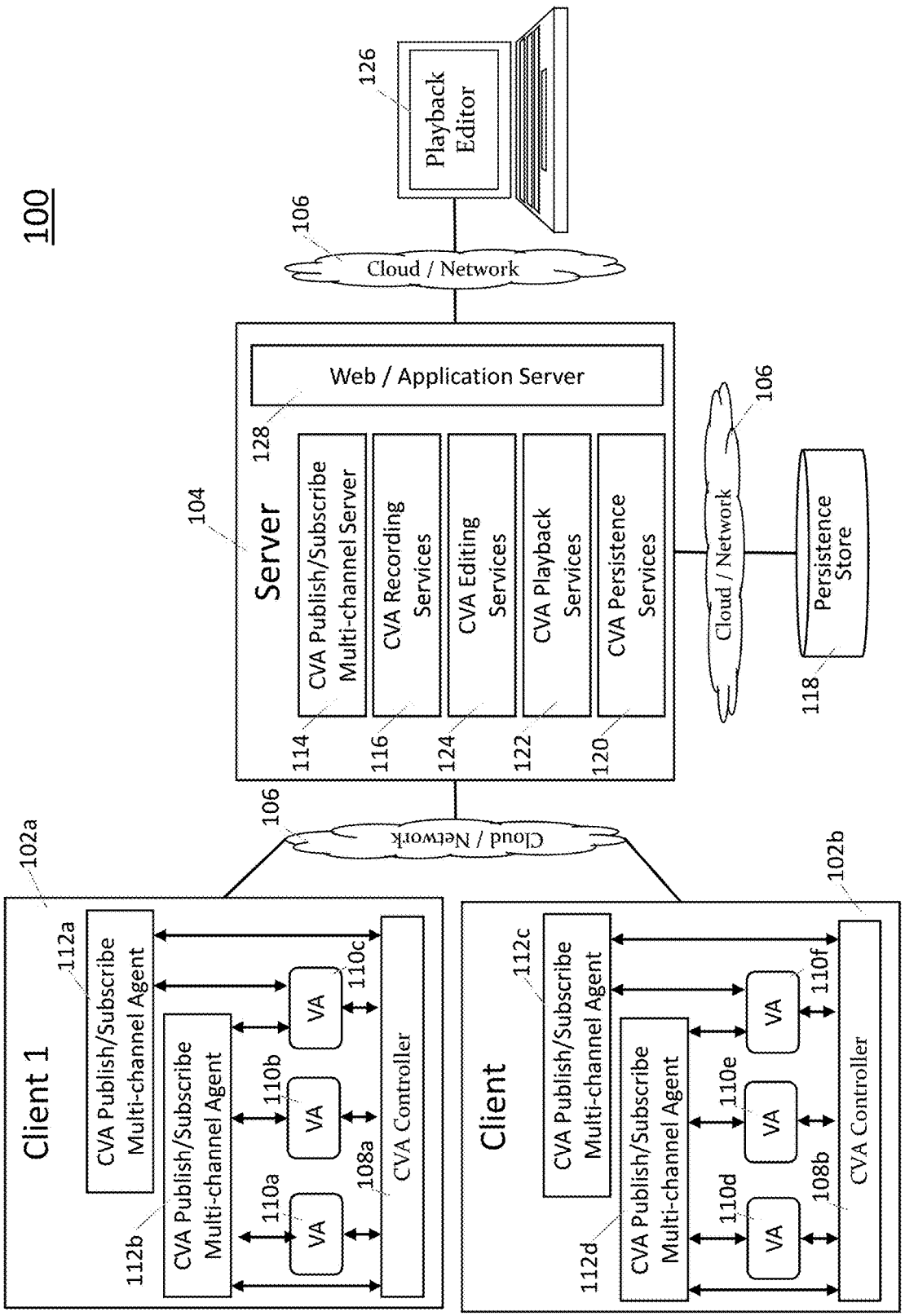
FIG. 1 is a block diagram of an example operating environment for a multi-channel Collaborative Visual Analytics (CVA) system for recording, editing, and playing back exploratory visual and data analytic sessions of one or more users according to one embodiment of the present disclosure.

FIG. 1 shows one example of an operating environment for a multi-channel Collaborative Visual Analytics (CVA) system 100 for recording, editing, and playing back exploratory visual and data analytic sessions of one or more users. A plurality of client devices 102a, 102b (referenced generally as client device 102) are connected on channels to a central CVA Multichannel server 104 (referenced herein as CVA server 104) through a cloud network 106, such as the Internet. Each client device 102 includes one or more CVA controllers 108a, 108b (referenced generally as CVA controller 108) managing one or more Visual Analytics (VA) 110a, 110b, 110c, 110d, 110e, 110f (referenced generally or collectively as VA 110), such as an interactive display. The CVA controller 108 controls what is being shown at one time. Each client device 102 also includes one or more CVA publish/subscribe multi-channel agents 112a, 112b, 112c, 112d (referenced generally as CVA agent 112) which interacts with the CVA server 104 through a CVA publish/subscribe multi-channel server agent 114 (referenced herein as CVA server agent 114) using WebSockets, such as HTML5 WebSockets, to publish/subscribe event flow facilities of each VA's 110 multi-media playback facilities. Basically, whatever action a user performs in a state, such as clicking a mouse on a displayed item, gets broadcast to the CVA server 104 and feedback is provided.

The CVA server 104 records events using CVA recording services 116 and/or distributes these events to other CVA controllers 108 via the CVA server agent 114. Interactions with the client devices 102 may include, but are not limited to, playing or pausing video or audio, invoking web services and returning their results, setting or removing filters, selecting or deselecting data, zooming, panning or controlling the size, location, or z-order of display windows, or applying viewing or audio controls used to reconfigure the media playback. The recording provides provenance of the user session(s) interacting with the VAs 110 by saving the interactions of the session in a persistence store 118 using CVA persistence services 120. Once recorded, the events may be reviewed using the CVA server's 104 CVA playback services 122, or edited, reorganized, augmented and otherwise manipulated by the CVA editing services 124 via a playback editor 126 connected to a web/application server 128 of the CVA server 104 through the cloud network 106 to create a "playback" script used to recreate the session or create a new session to communicate the essence of the CVA interaction session. Using the playback editor 126, certain events may be disabled or additional events may be added in for the playback. Others may invoke the playback script to passively view, or actively interact with the CVA system 100 to learn from the rationale and insights, or to spawn a new or forked session for further exploration with the same or new data.

Figure 2:
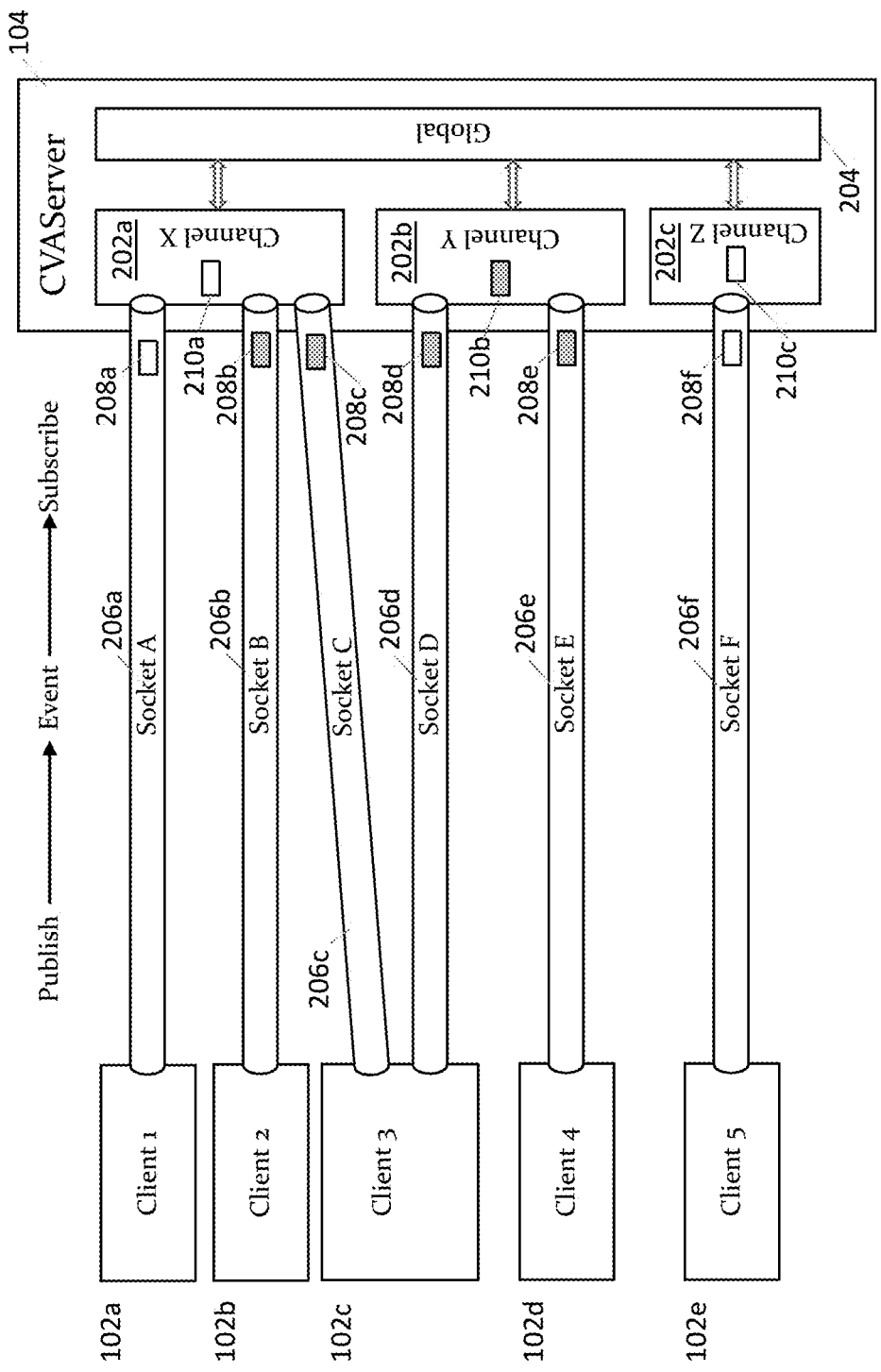
FIG. 2 is a pictorial diagram illustrating an example communications overview according to one embodiment of the present disclosure.

Turning now to FIG. 2, an example multi-channel serving environment 200 is shown. The CVA system 100 also comprises a publish/subscribe library (not shown) used by the CVA controller 108 to identify events they wish to receive either locally or across the multi-channel serving environment 200 through subscriptions to trigger actions, and to publish events either locally or across the multi-channel serving environment 200. Each channel 202 reflects a multi-media stream and each event carries context information about user interactions with the stream.

In FIG. 2, CVA server 104 is currently supporting three local channels X 202a, Y 202b, Z 202c (referenced collectively as local channel 202) and one global channel 204. Channels 202 allow communications over a group of Web-Sockets 206 between client devices 102. Global communications occur over all WebSockets 206 among all client devices 102 using global channel 204.

The global channel 204 is able to create playback using events recorded from all local channels 202. Each local channel 202 supports the use of multiple WebSockets 206a, 206b, 206c, 206d, 206e, 206f (referenced generally and collectively as WebSocket 206). Events are published and received by subscribers over WebSockets 206 or locally. WebSockets 206 allow individual client devices 102 to communicate with the CVA server 104. Information may be stored at a socket, channel, or global level.

Upon initiation, CVA controller 108 may be configured to register with a WebSockets based channel 202 managed by the CVA server 104. When a subscription is established and flagged for "multichannel" a remote subscription is created at the CVA server 104 across the WebSocket channel 202.

In this example, channel X 202a has three participants: client 102a using WebSocket 206a, client 102b using WebSocket 206b and client 102c using WebSocket 206c. Client 102c is also participating in a session on channel Y 202b over WebSocket 206d with client 102d, which is connected via WebSocket 206e. Channel Z 202c is in use by a single client 102e over WebSocket 206f.

When an event is published and flagged for "multichannel," the event is presented for action locally as well as being pushed across the WebSocket channel 202 to the CVA server 104. In FIG. 2, socket status boxes 208a, 208b, 208c, 208d, 208e, 208f (referenced generally and collectively as socket status box 208) indicate the status of corresponding Web-Socket 206. For example, filled socket status boxes 208b, 208c, 208d, 208e indicate that WebSockets 206b, 206c, 206d and 206e are ready for an action to be taken. Likewise, for events in which full participation of each participant in a channel 202 is required, channel status boxes 210a, 210b and 210c indicate the channel status. As all sockets 206d and 206e of channel Y 202b are ready, channel box 202b is filled to indicate a channel ready status.

The publish/subscribe library also provides facilities to unsubscribe previous local or remove (multichannel) subscriptions. The library also provides events used to control recording at the CVA server 104 on a per channel basis or for all channels. The CVA system 100 may sequence events by using a globally managed sequence number at the CVA server 104. When recording is enabled, events may be queued and persisted in a data store 118. State change event data is maintained in a consistent state in the data store 118 based on state changing events. The saved events may later be reviewed, edited, and reorganized into a playback script. The CVA 104 server can then be asked to execute a playback script for a specified set of channels 202. Playback may be automated based on time or indexed on demand (or a combination thereof). Extensions provide the association of services and events with the ability to record the service request and/or response so the playback can optionally repeat the same data associated with events, or can playback newer data than when it was originally recorded.

Figure 3:
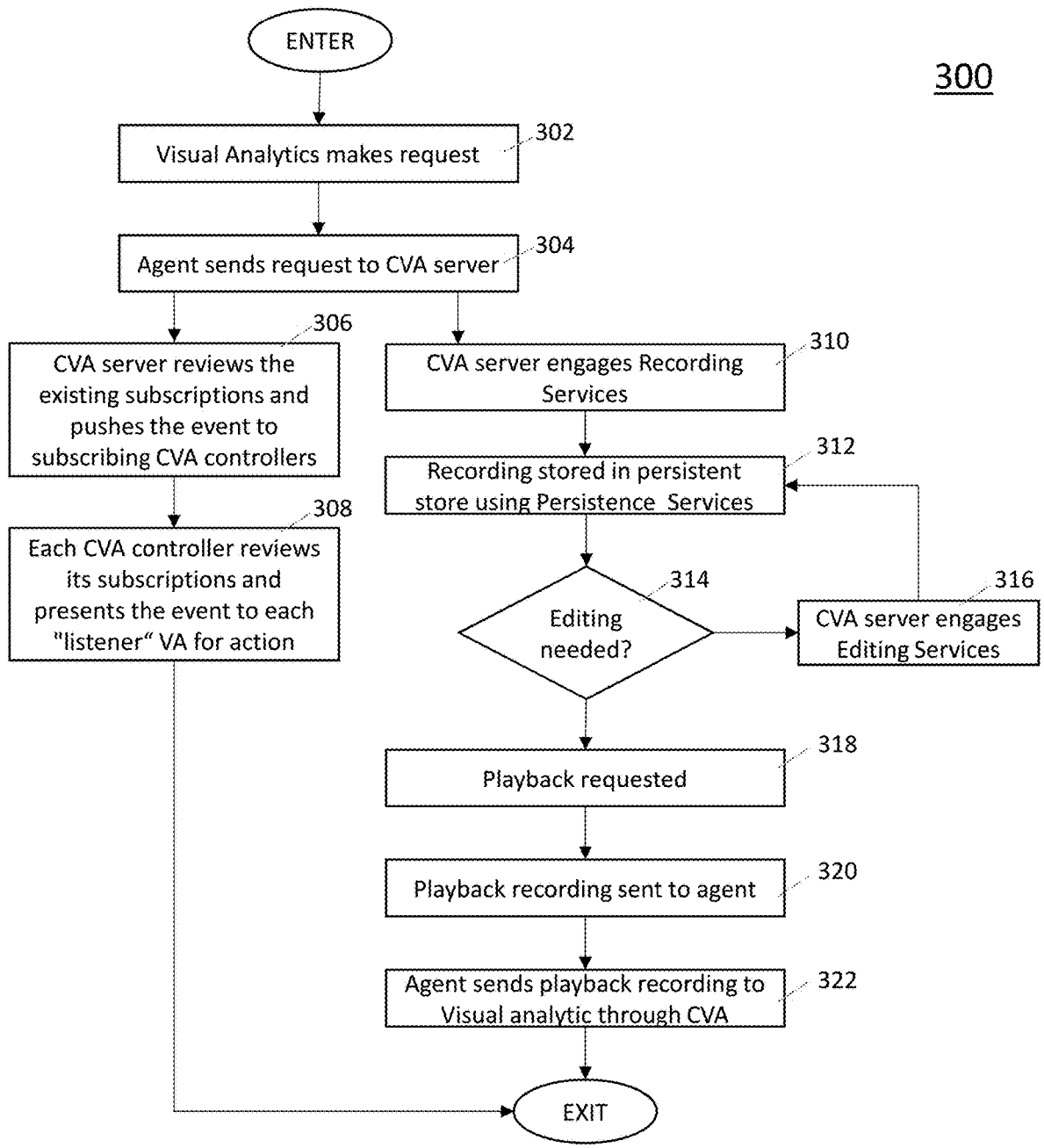
FIG. 3 is an operational flow diagram illustrating a process of recording, editing and playing back exploratory visual analytic sessions involving multiple sources according to one embodiment of the present disclosure.

Referring now to FIG. 3, a flowchart 300 is provided illustrating an example process for using the CVA system 100. Beginning in step 302, a VA 110 in use on a client device 102, makes a request (e.g., a user clicks a mouse on a displayed item). The request is sent, at step 304, to the CVA server 104 through the CVA agent 112 and CVA server agent 114. The CVA server 104, upon receipt of a published event, reviews the existing subscriptions, at step 306 and pushes the event to subscribing CVA controllers 102. Upon receipt of an event across a WebSocket channel 202, the CVA controller reviews its subscriptions, at step 308, and presents the event to each "listener" VA 110 for action.

Additionally, when the CVA server 104 receives the published event, the CVA server 114 engages the recording services 116, at step 310, and the recording is stored, at step 312, in the persistent store 118 using the persistence services 120. If editing is needed, at step 314, the CVA server 104 engages the editing services, at step 316, and the recording may be edited manually using the playback editor 126. It should be noted that a system administrator may also choose to edit the recording at any time using the playback editor. The edited recording is stored in persistent storage 118 at step 312.

When playback is requested (e.g., through a VA 110), at step 318, the CVA server 104 sends the playback recording to the CVA agent 112 of the requesting client device 102, at step 320. The CVA agent 112 sends the playback recording to the CVA controller 108 for viewing on the VA 110.

Example Demonstration

Figure 4:
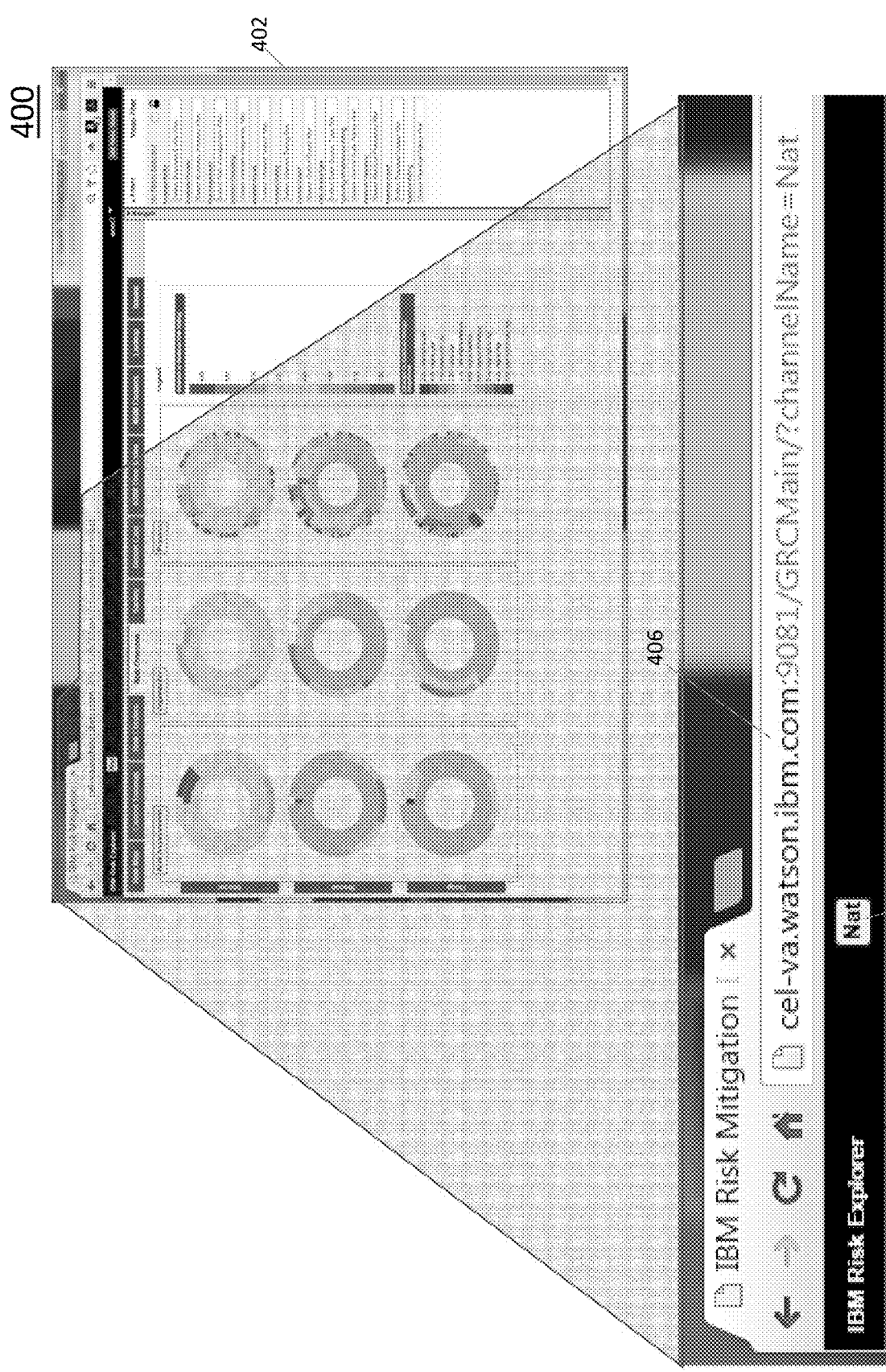
FIG. 4 is a pictorial diagram illustrating a first client logging in to the system of FIG. 1 on a first channel according to one embodiment of the present disclosure.

FIGS. 4 through 20 illustrate an example demonstration of the multi-channel collaborative system 100 of FIG. 1 in operation. Beginning in FIG. 4, a screen shot 402 shows a view of a first client's (e.g., Client 1 using client device 102a) computer screen 400. Client 1 logs into the multi-channel collaborative system 100 on channel "Nat" 404. The channel name "Nat" 404 is shown in an address bar 406 as well as a channel bar 408. The channel bar 408 displays the names of all active channels on the multi-channel collaborative system 100. Client 1 is currently viewing a presentation of data in a "Risk Overview" VA 410. Each tab 412 along the top edge of the presentation may be clicked by the user to enable a different view (i.e. VA) of the data.

Figure 5:
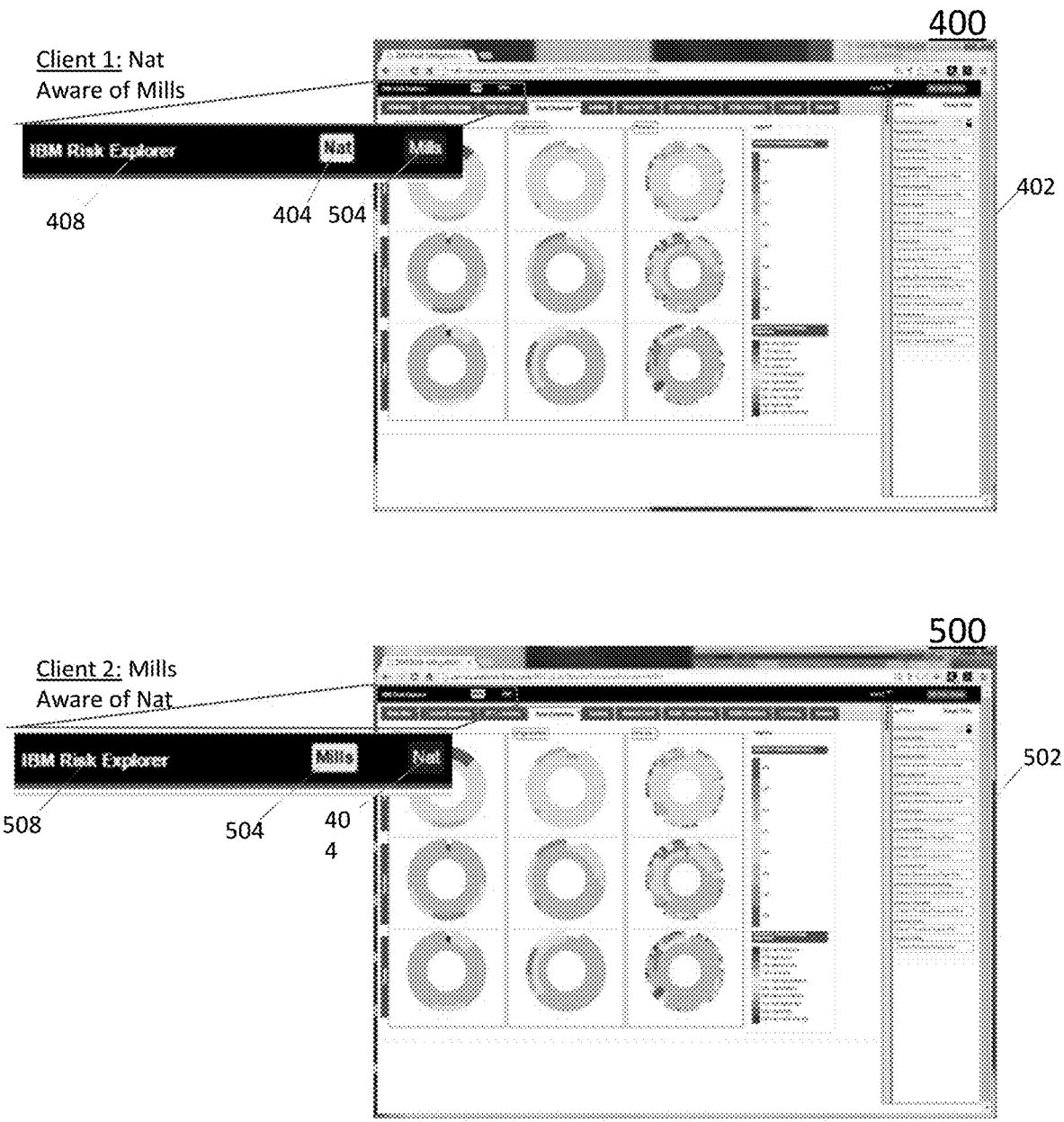
FIG. 5 is a pictorial diagram illustrating a second client logging in to the system of FIG. 1 on a second channel according to one embodiment of the present disclosure.

In FIG. 5, a second client (e.g., Client 2 using client device 102b), logs into the CVA system 100 on channel "Mills" 504. A screen shot 402 of client 1's computer screen 400 and a screen shot 502 of client 2's computer screen 500 are shown in FIG. 5. When client 2 logs on, client 1 becomes aware of client 2 on the second channel "Mills" 504 as indicated in client 1's channel bar 408. Additionally, client 2 is aware of client 1's presence on channel "Nat" as shown in client 2's channel bar 508.

Figure 6:
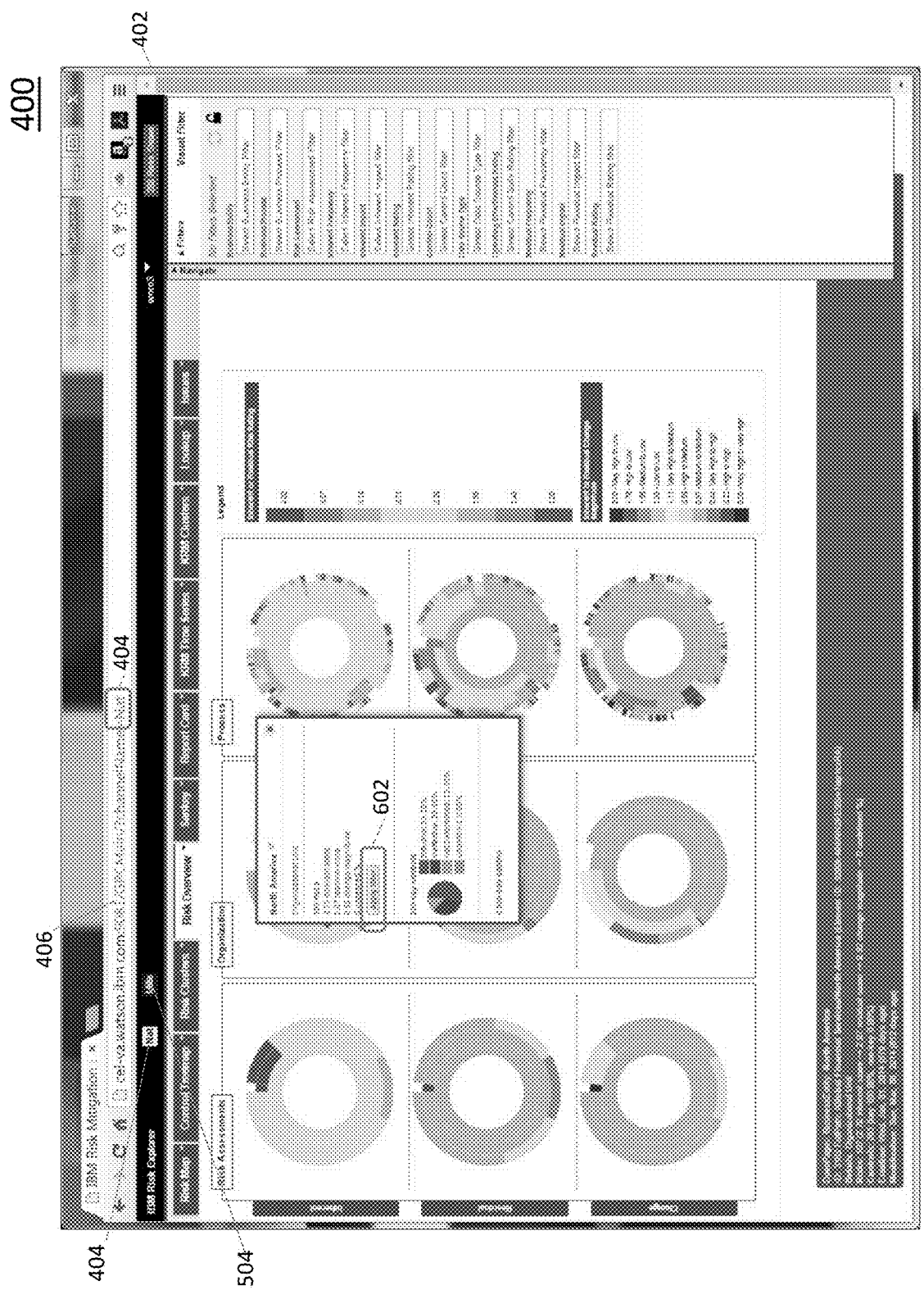
FIG. 6 is a pictorial diagram illustrating a second client applying a filter to a presentation of data according to one embodiment of the present disclosure.
Figure 7:
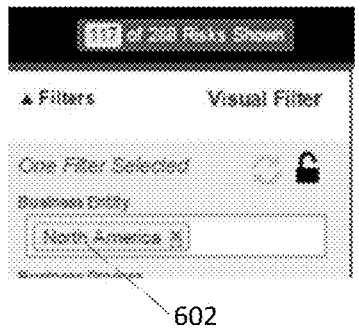
FIG. 7 is a pictorial diagram illustrating the system applying the filter selected by the second client to the presentation of data shown on both the first and second clients according to one embodiment of the present disclosure.
Figure 7:
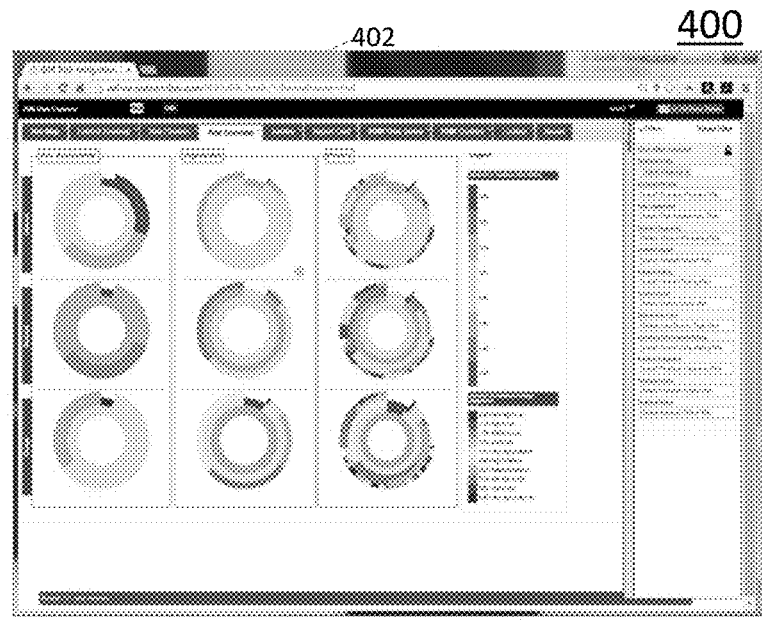
Figure 7:
Figure 7:
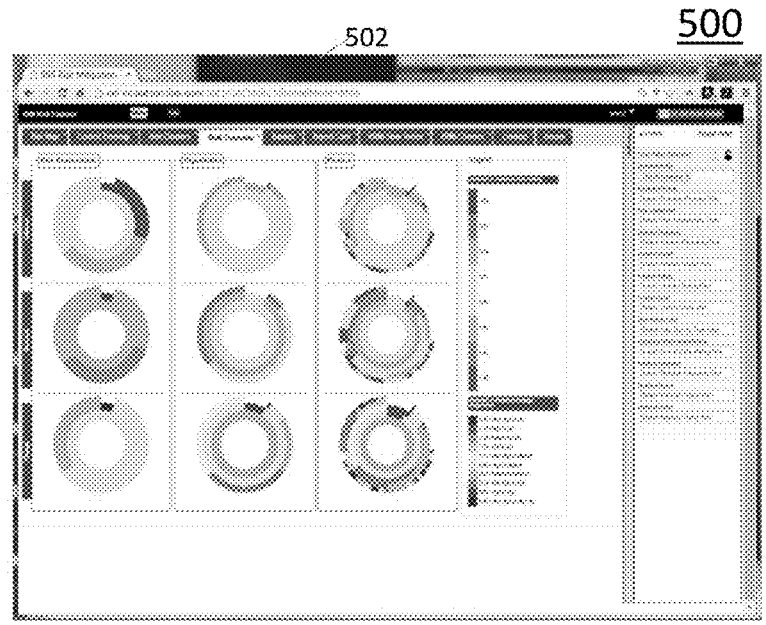

In FIG. 6, client 1 sets a filter 602 which filters the data presented to only show relevant data for North America. FIG. 7 shows that when client 1 sets the filter 602 to North America, the changes are reflected by the presentation of data on both client 1 computer screen 400 and client 2's computer screen 500.

Figure 8:
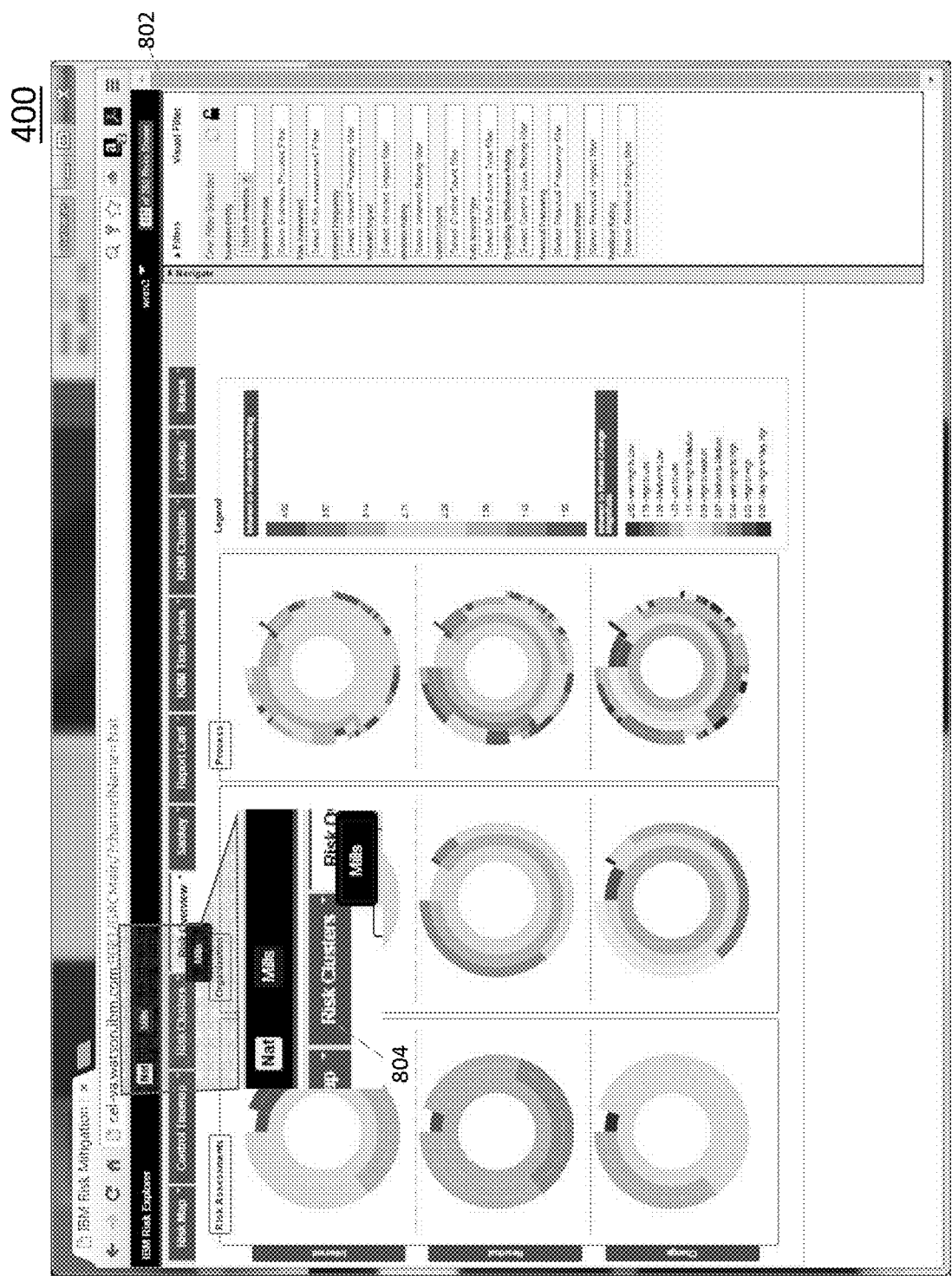
FIG. 8 is a pictorial diagram illustrating the first client changing the view of the presentation of data on the second client according to one embodiment of the present disclosure.
Figure 9:
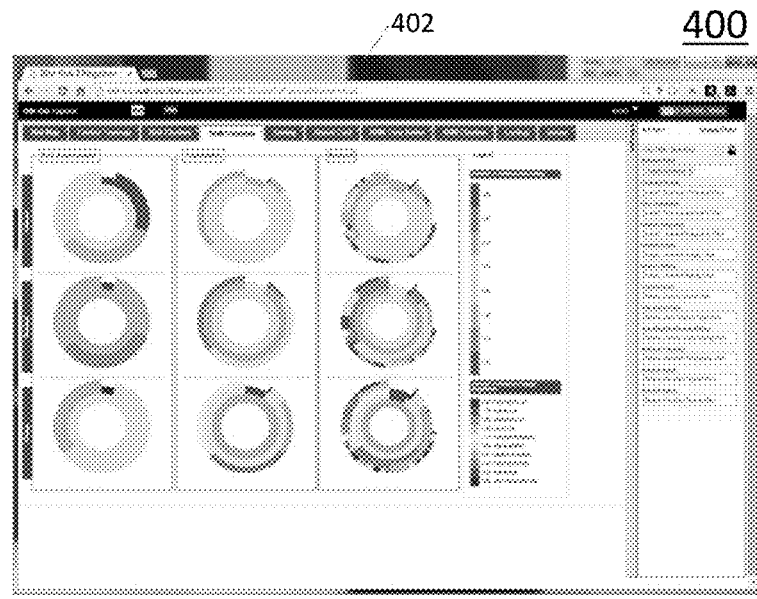
FIG. 9 is a pictorial diagram illustrating displaying the presentation of data on the second client as changed in FIG. 8 according to one embodiment of the present disclosure.
Figure 9:
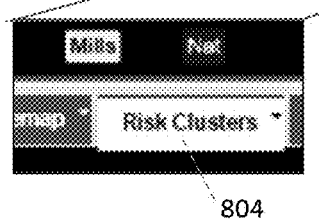
Figure 9:
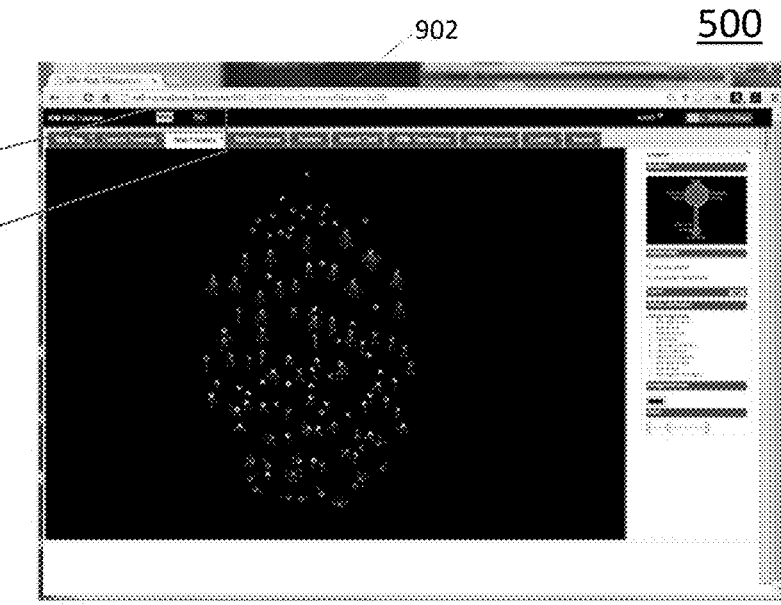

FIG. 8 shows a screen shot 802 of client 1 changing the displayed view on client 2's screen to that of a "Risk Clusters" VA 804. After the displayed view is changed, in FIG. 9, nothing is changed on the computer screen 400 for client 1. However, client 2's computer screen 500 now shows the "Risk Clusters" VA 804. The data filter 602 for North America is still in play for both clients.

Figure 10:
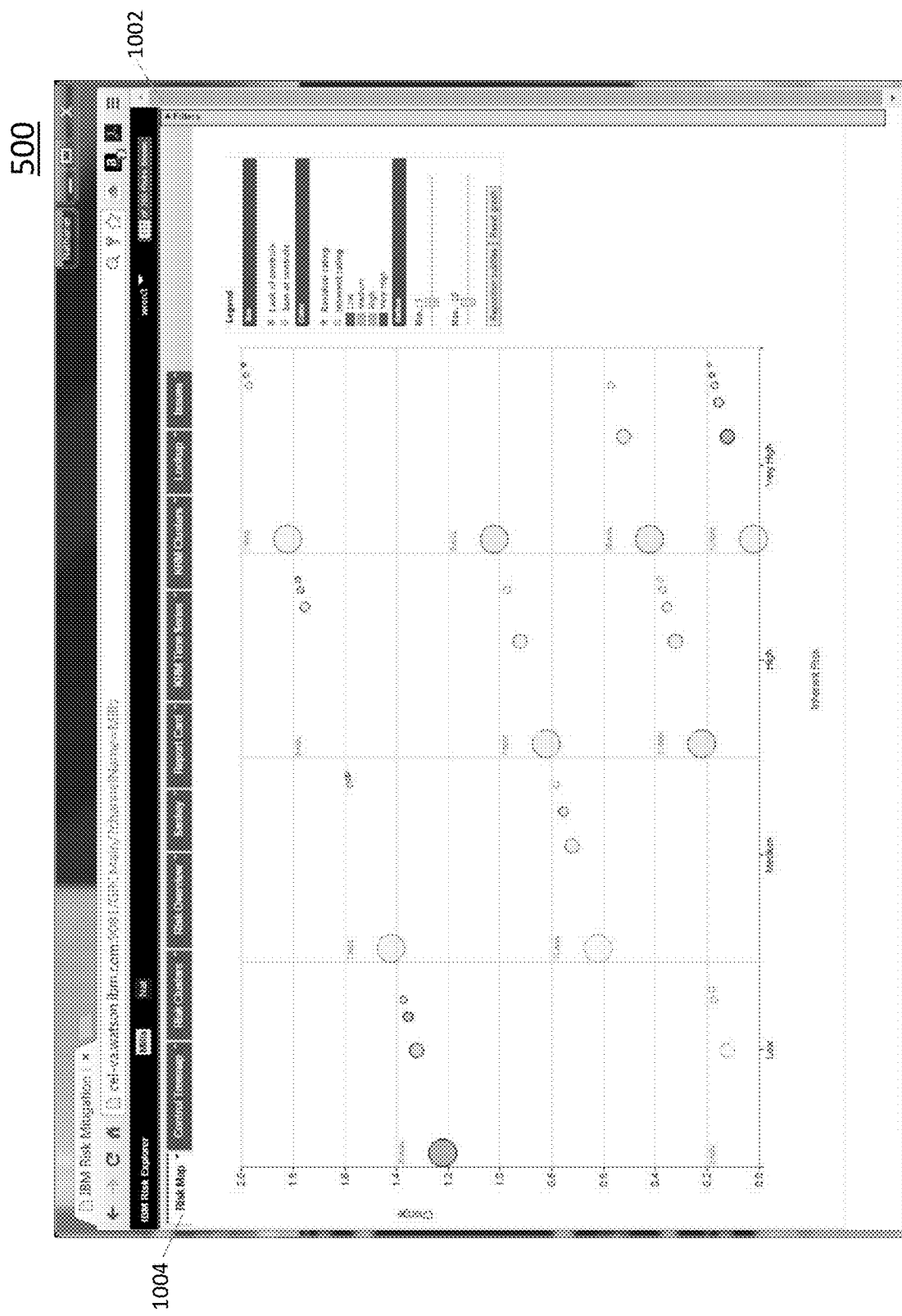
FIG. 10 is a pictorial diagram illustrating the second client changing the view of the presentation of data on the second client without affecting the view of the first client according to one embodiment of the present disclosure.
Figure 11:
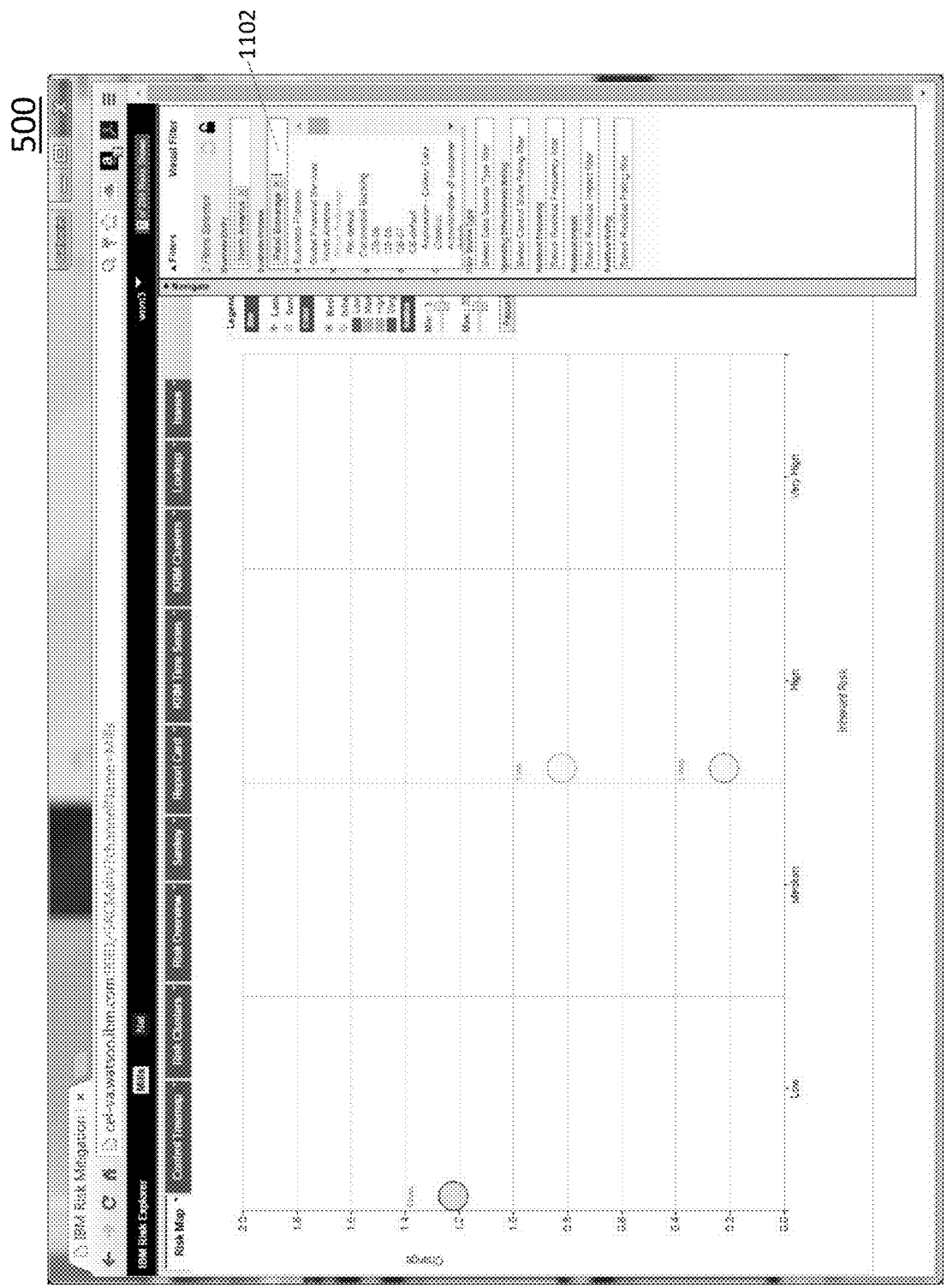
FIG. 11 is a pictorial diagram illustrating the second client applying a second filter to the presentation of data according to one embodiment of the present disclosure.
Figure 12:
FIG. 12 is a pictorial diagram illustrating the system applying the new filter selected by the second client to the presentation of data shown on both the first and second clients according to one embodiment of the present disclosure.
Figure 13:
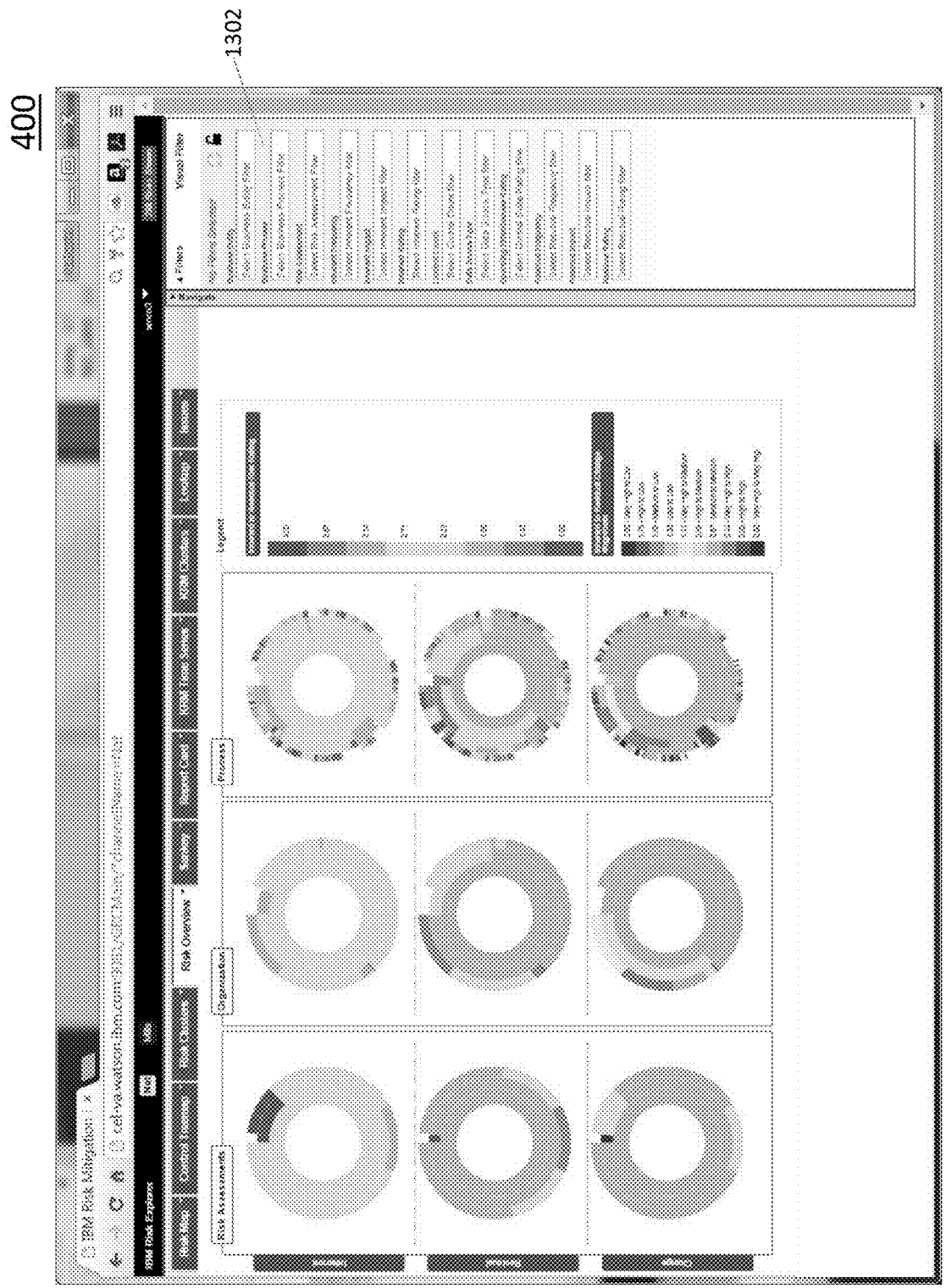
FIG. 13 is a pictorial diagram illustrating the first client removing the application of both filters according to one embodiment of the present disclosure.
Figure 14:
FIG. 14 is a pictorial diagram illustrating the system applying the removal of both filters selected by the first client to the presentation of data shown on both the first and second clients according to one embodiment of the present disclosure.
Figure 14:
Figure 14:
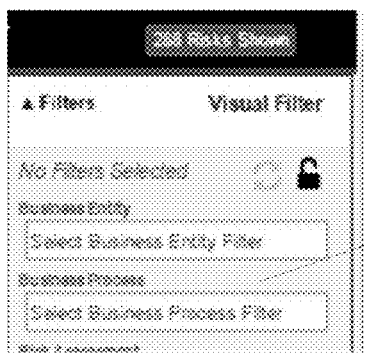
Figure 14:
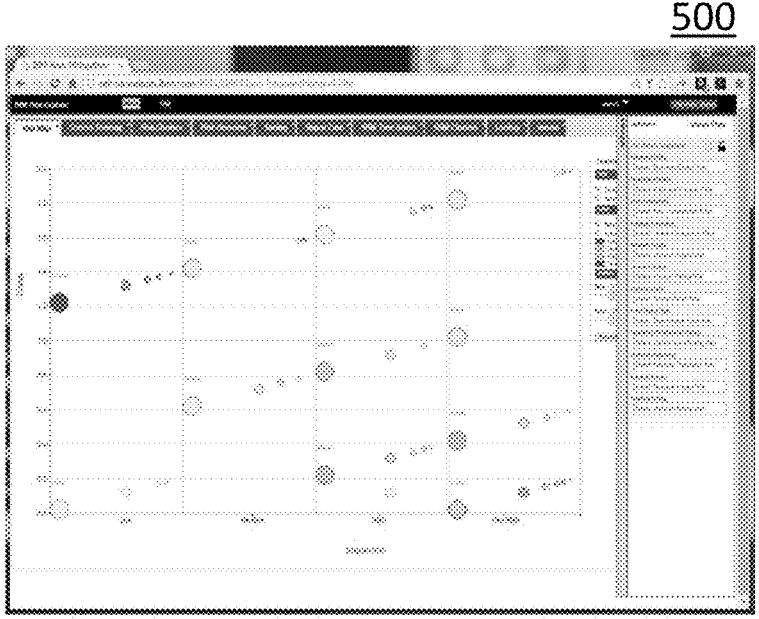
Figure 15:
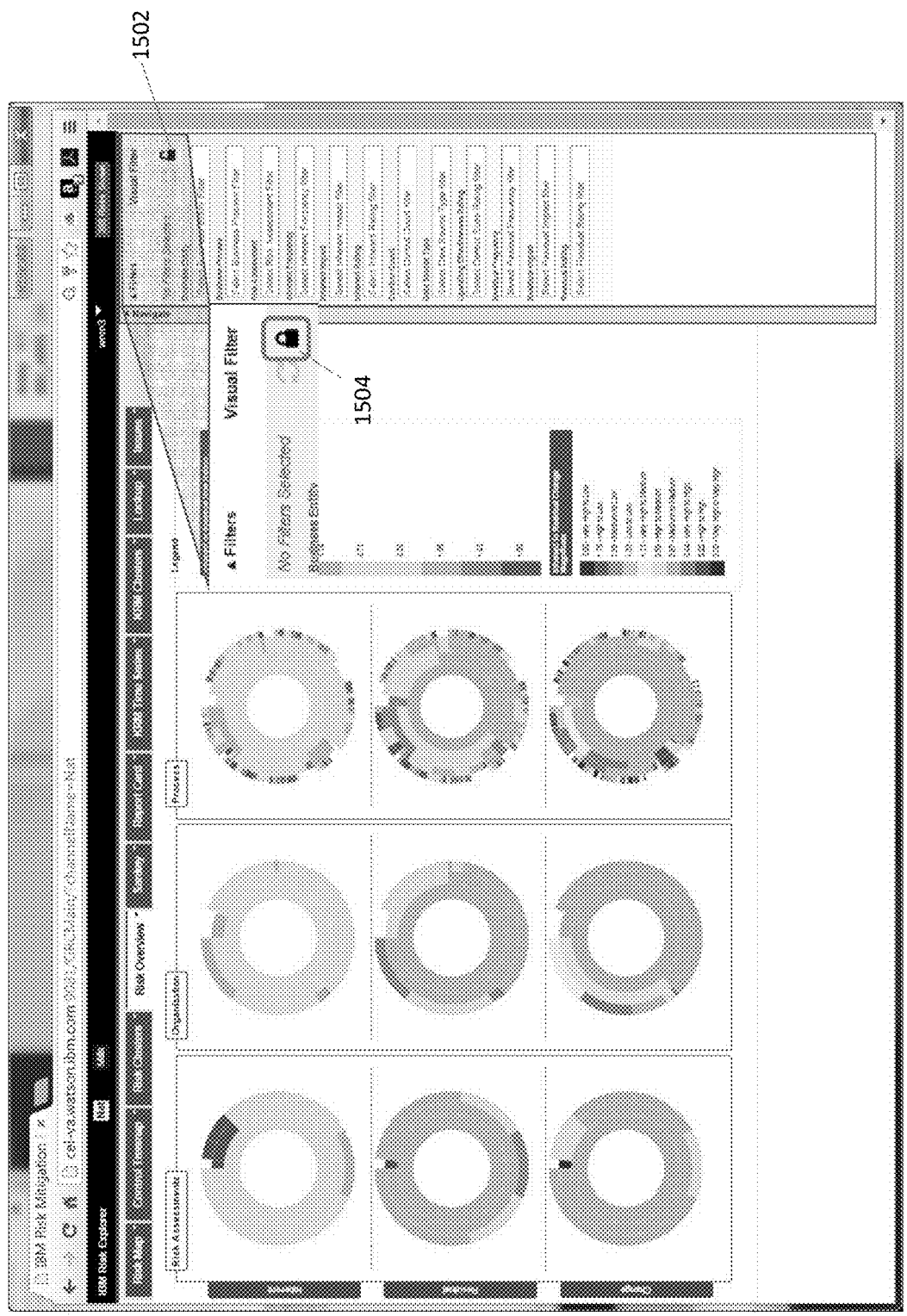
FIG. 15 is a pictorial diagram illustrating the first client locking their state according to one embodiment of the present disclosure.

However, as shown in FIGS. 10 through 12, client 2 may change their own display without affecting the display of client 1. FIG. 10 shows a screen shot 1002 of client 2 changing his own display to the "Risk Map" VA 1004. In FIG. 11, client 2 adds a data filter 1102 for "Retail Brokerage" and applies the new filter to client 1. FIG. 12 shows the "Retail Brokerage" data filer 1102 has been applied to both client computer screens 400, 500. However, it should be noted that client 2's change to the "Risk Map" VA 1004 has not been applied to client 1's view. Client 1's computer screen 400 still displays the "Risk Overview" VA 410. In FIG. 13, client 1 removes the "Retail Brokerage" filter, under "Business Processes" 1300. The filter removal affects the data presentation on both computer screens 400, 500 in FIG. 14.

Figure 16:
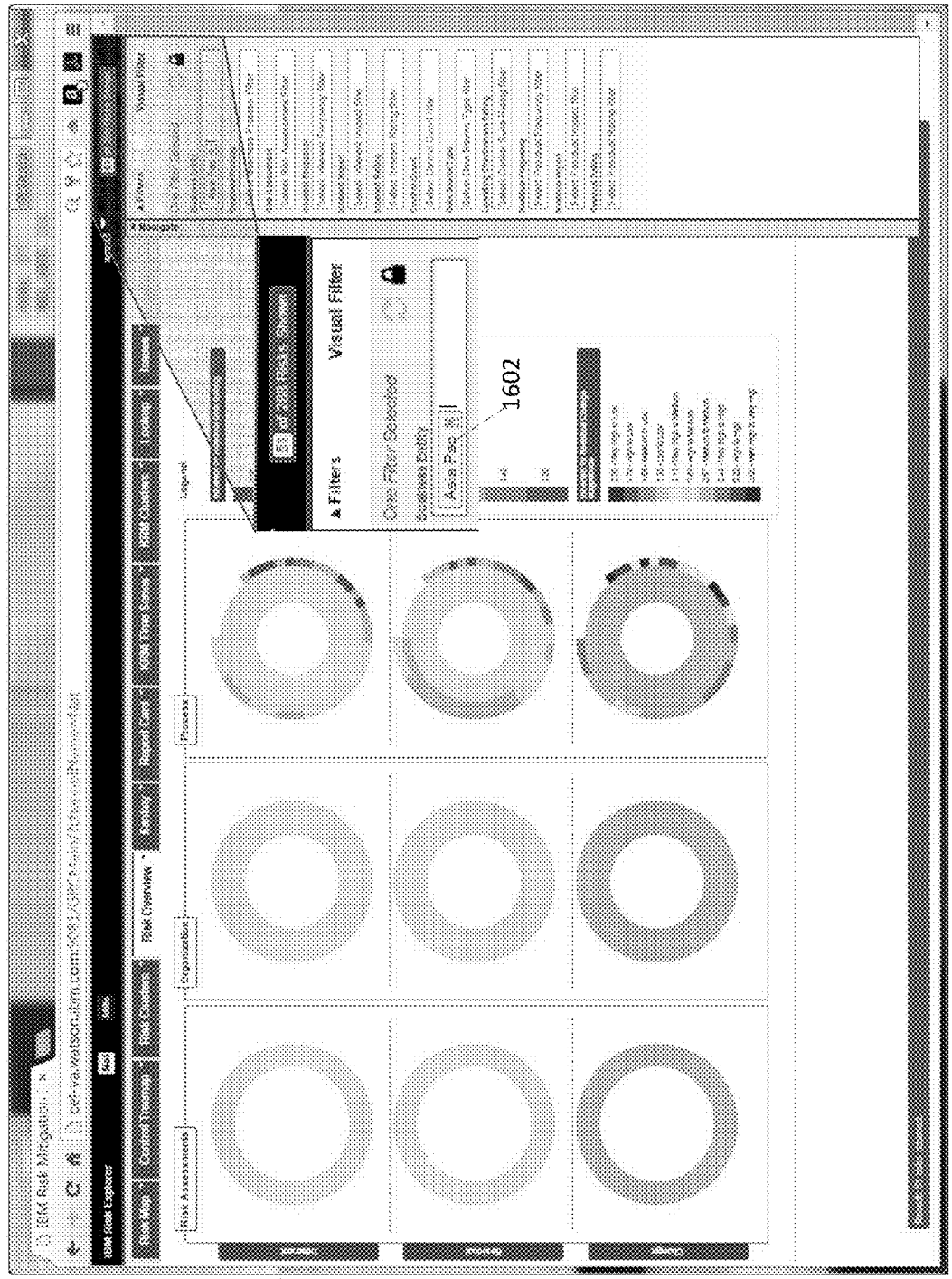
FIG. 16 is a pictorial diagram illustrating the first client applying a filter to the presentation of data in a locked state without affecting the second client according to one embodiment of the present disclosure.
Figure 17:
FIG. 17 is a pictorial diagram illustrating the new filter settings from the first client in the locked state do not affect the presentation of data on the second client according to one embodiment of the present disclosure.
Figure 17:
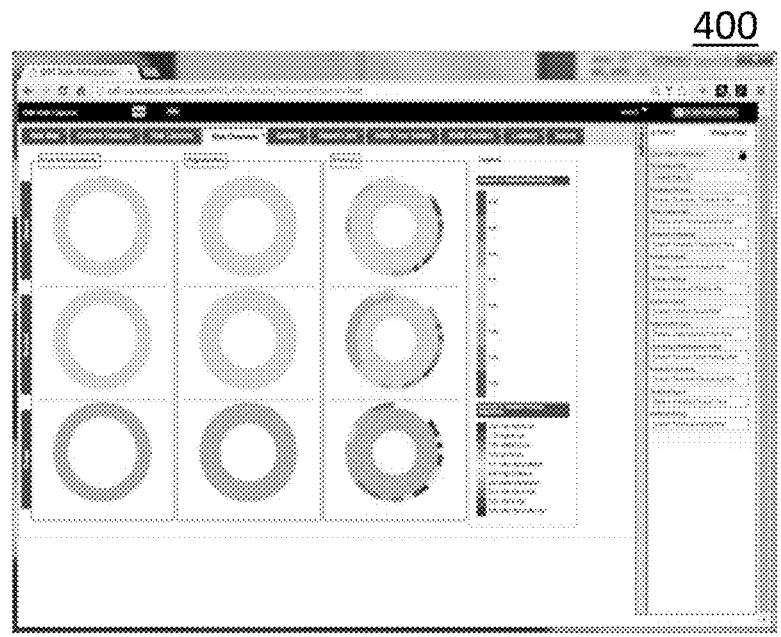
Figure 17:
Figure 17:
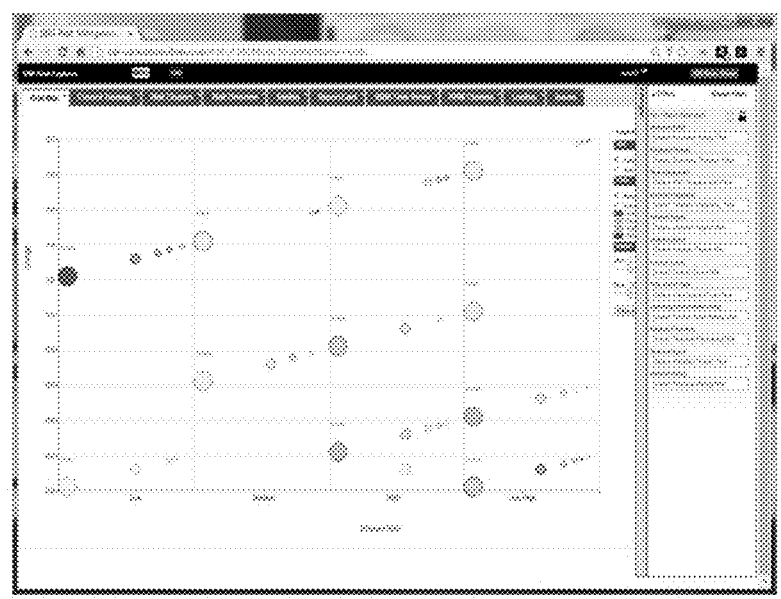
Figure 18:
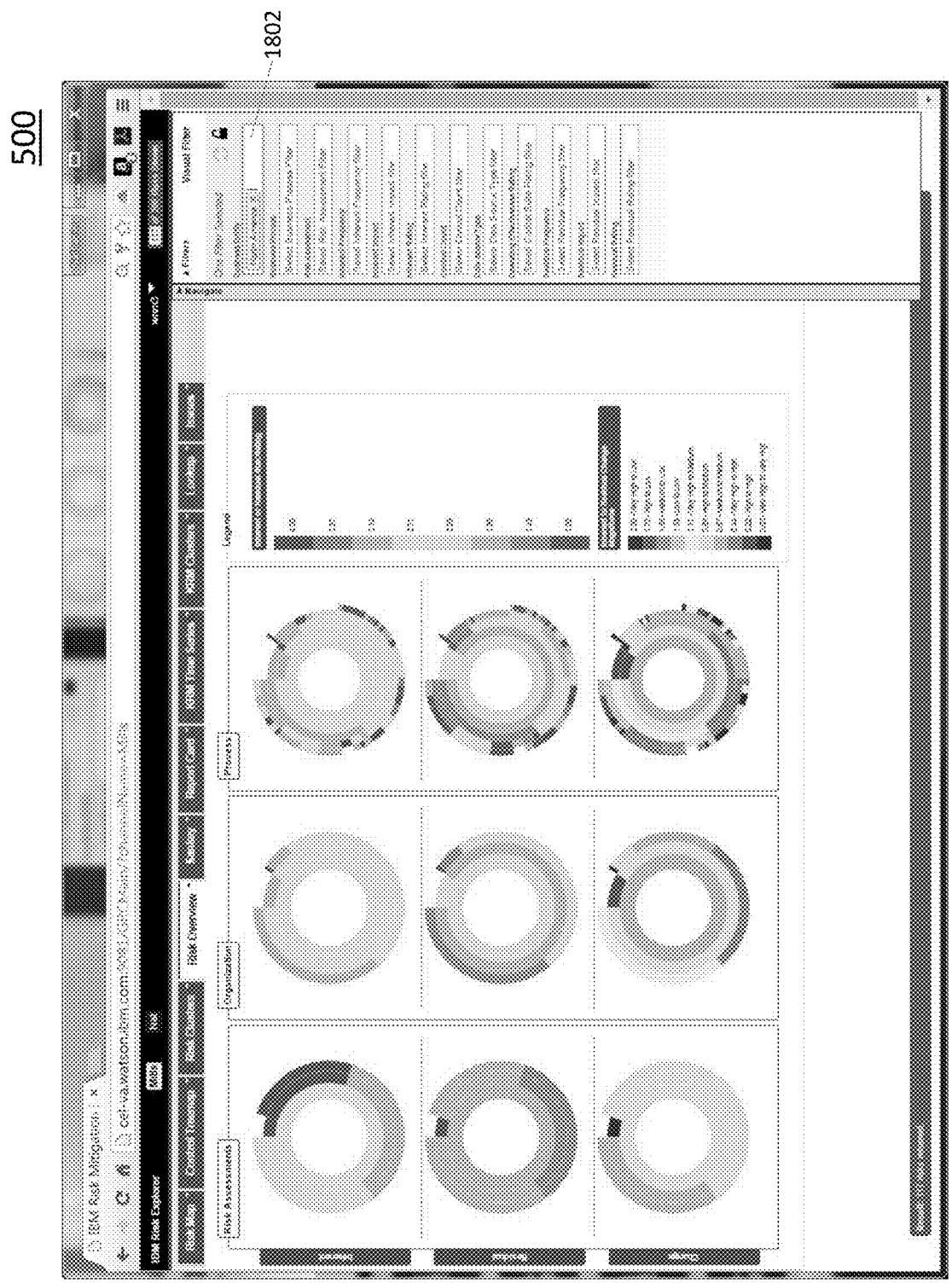
FIG. 18 is a pictorial diagram illustrating the second client changing views of the presentation of data and applying a new filter according to one embodiment of the present disclosure.
Figure 19:
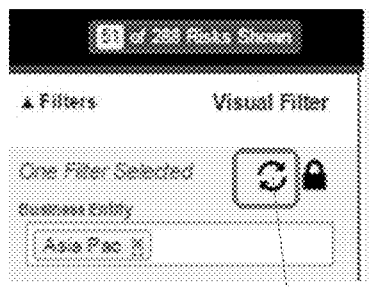
FIG. 19 is a pictorial diagram illustrating the system notifying the first client of changes occurring during a locked state according to one embodiment of the present disclosure.
Figure 19:
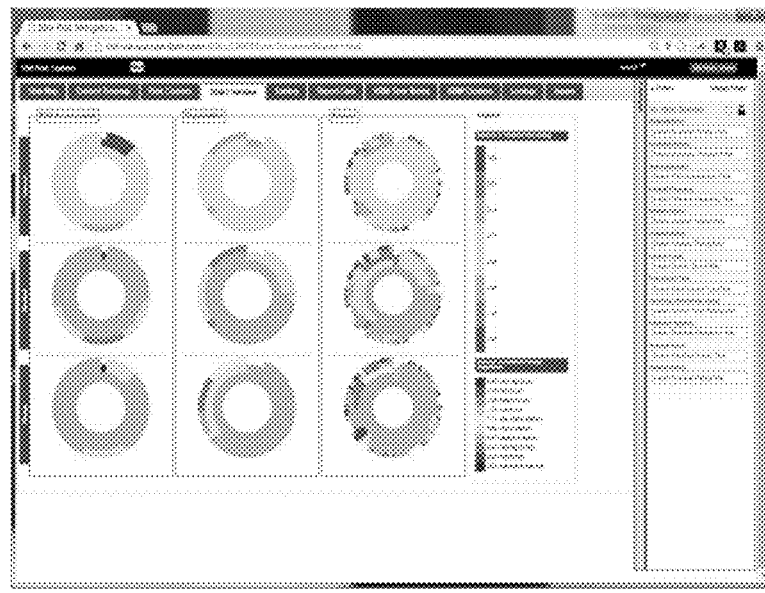
Figure 19:
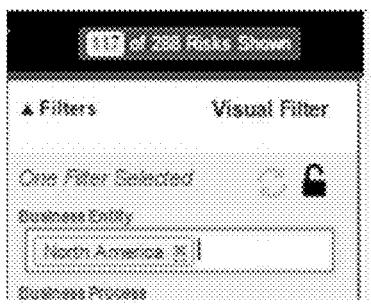
Figure 19:
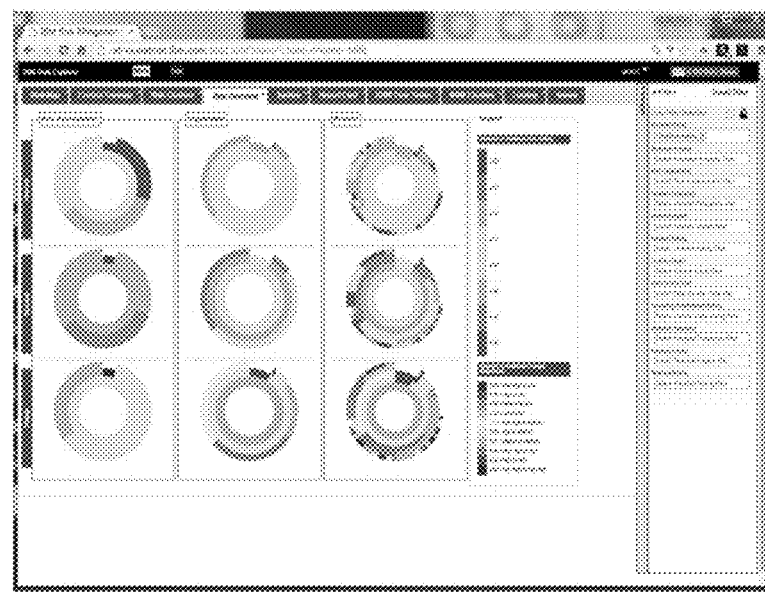
Figure 20:
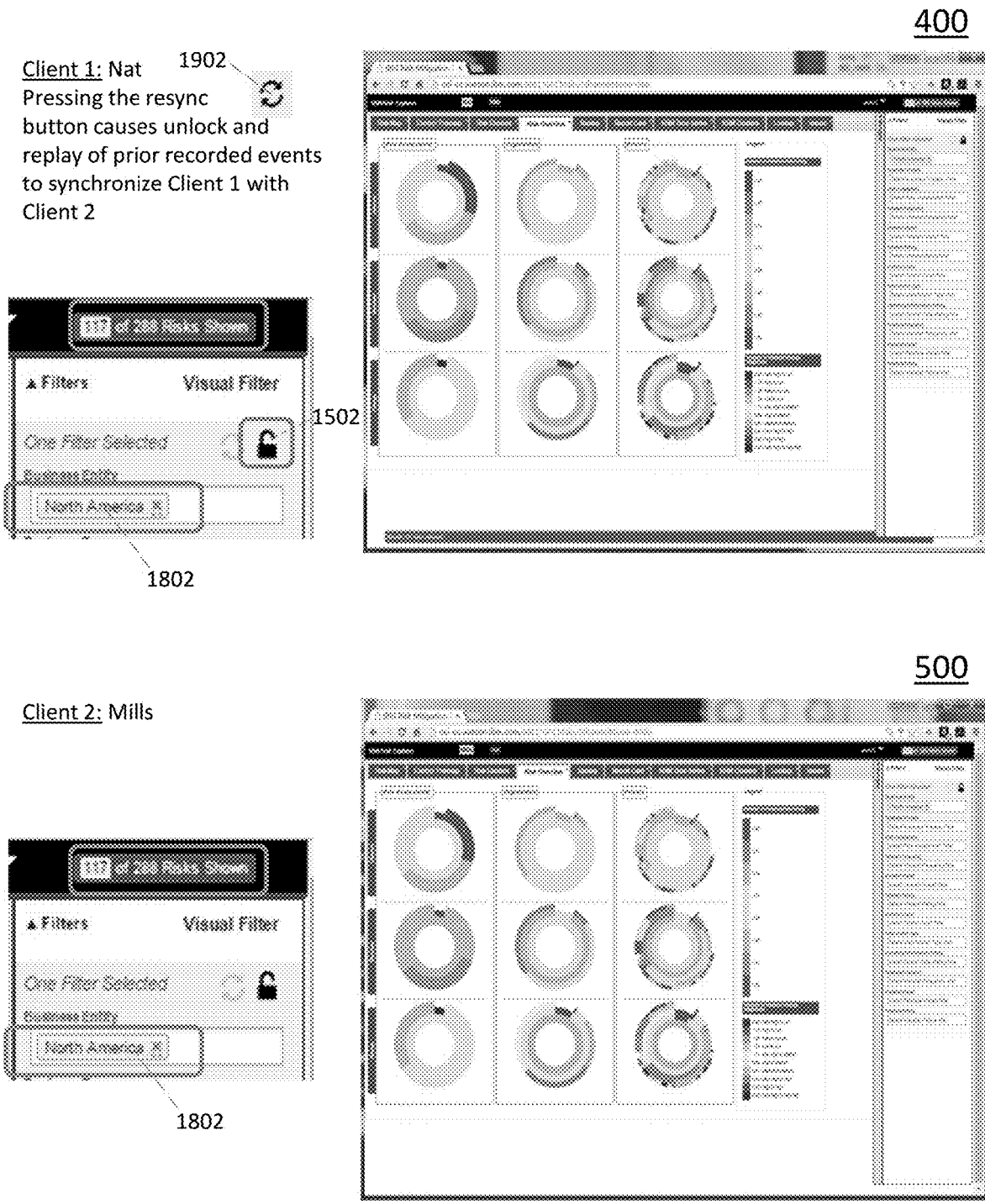
FIG. 20 is a pictorial diagram illustrating the first client resyncing to apply playback of changes from the second client according to one embodiment of the present disclosure.

In system 100, at least one of the collaborators can temporarily halt delivery of state changing events so they can work independently from other collaborators, yet be made aware when other collaborators have caused state changing events to be published. For example, in FIG. 15, client 1 decides to lock their state and stop processing events from other clients. This state change is accomplished by selecting the unlock icon 1502, which then turns to a locked icon 1504. Now, changes to client 1's computer screen 400 do not affect client 2's computer screen 500. For example, as shown in FIG. 16, client 1 may apply the business entity filter "Asia Pac" 1602 to his own presentation, but this filter is not applied to client 2, as shown in FIG. 17. Client 2 has no business entity filters 1702 applied. While client 1 has their state locked, client 2 applies the business entity filter "North America" 1802 to the data presented on his screen 500, as shown in FIG. 18. In FIG. 19, client 1 becomes aware that a change has occurred in system as the resync button 1902 becomes enabled on client 1's computer screen 400. The new filter 1802 is applied to the data presented on client 2's screen 500, but not to the data shown on client 1's screen 400. By pressing the resync button 1902, as shown in FIG. 20, client 1 causes his state to become unlocked, as shown by the unlock icon 1502 and a replay of prior recorded events synchronize client 1's screen 400 with client 2's screen 500. Note that both screens 400, 500 now have the business entity filter "North America" 1802 applied.

Information Processing System

Figure 21:
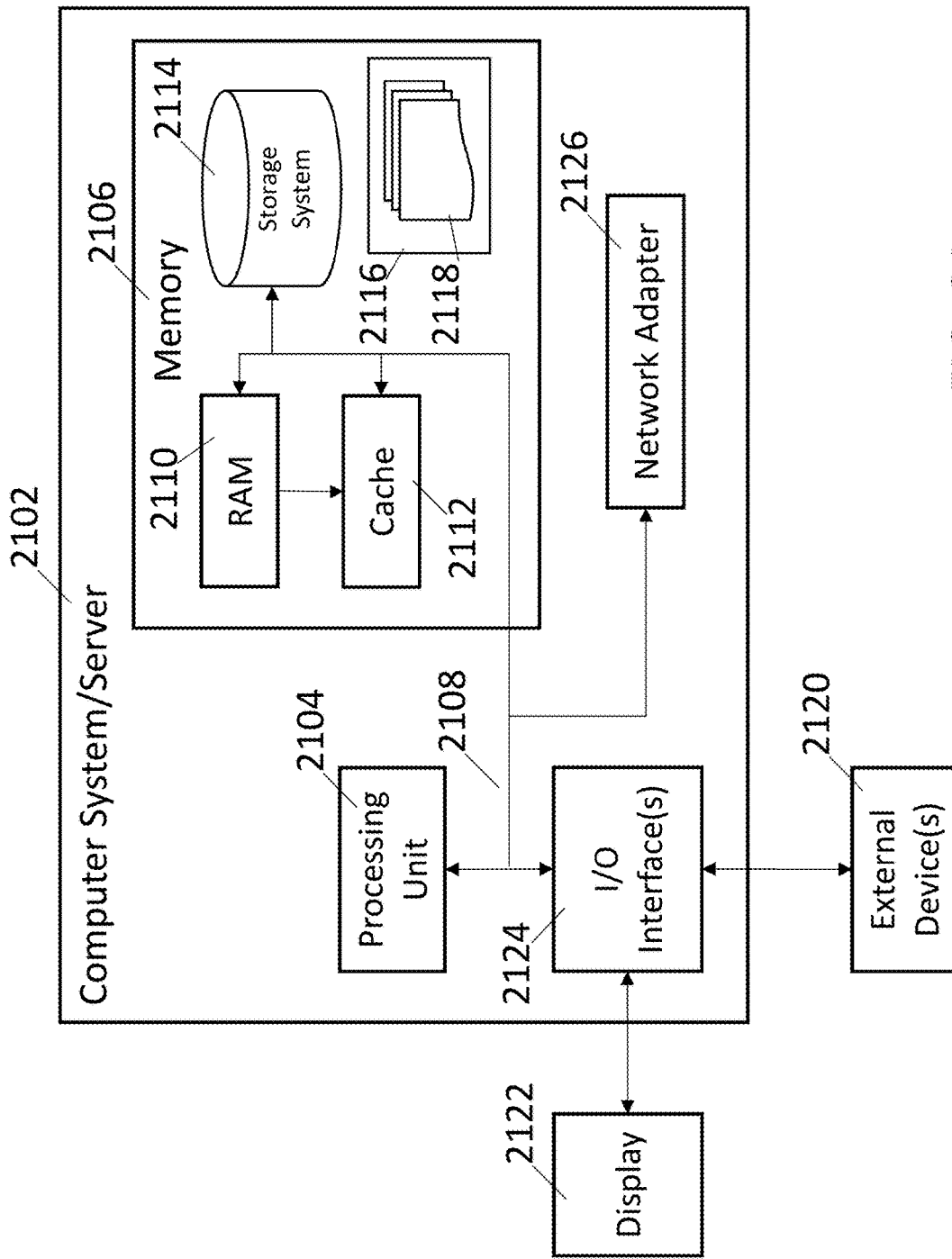
FIG. 21 is a block diagram of illustrating one example of an information processing system according to one embodiment of the present disclosure.

Referring now to FIG. 21, this figure is a block diagram illustrating an information processing system that can be utilized in embodiments of the present disclosure. The information processing system 2102 is based upon a suitably configured processing system configured to implement one or more embodiments of the present disclosure (e.g., client device 102, CVA multichannel server 104). Any suitably configured processing system can be used as the information processing system 2102 in embodiments of the present disclosure. The components of the information processing system 2102 can include, but are not limited to, one or more processors or processing units 2104, a system memory 2106, and a bus 2108 that couples various system components including the system memory 2106 to the processor 2104.

The bus 2108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 21, the main memory 2106 ... shown in FIG. 1. One or more of these components can reside within the processor 2104, or be a separate hardware component. The system memory 2106 can also include computer system readable media in the form of volatile memory, such as random access memory (RAM) 2110 and/or cache memory 2112. The information processing system 2102 can further include other removable/non-removable, volatile/non-volatile computer system storage media. By way of example only, a storage system 2114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, Solid State Drive (SSD), or other optical media can be provided. In such instances, each can be connected to the bus 2108 by one or more data media interfaces. The memory 2106 can include at least one program product having a set of program modules that are configured to carry out the functions of an embodiment of the present disclosure.

Program/utility 2116, having a set of program modules 2118, may be stored in memory 2106 by way of example, and not limitation, as well as an operating system, one or more application programs, other program modules, and program data. Each of the operating system, one or more application programs, other program modules, and program data or some combination thereof, may include an implementation of a networking environment. Program modules 2118 generally carry out the functions and/or methodologies of embodiments of the present disclosure.

The information processing system 2102 can also communicate with one or more external devices 2120 such as a keyboard, a pointing device, a display 2122, etc.; one or more devices that enable a user to interact with the information processing system 2102; and/or any devices (e.g., network card, modem, etc.) that enable computer system/server 2102 to communicate with one or more other computing devices. Such communication can occur via I/O interfaces 2124. Still yet, the information processing system 2102 can communicate with one or more networks such as a local area network (LAN), a general wide area network (WAN), and/or a public network (e.g., the Internet) via network adapter 2126. As depicted, the network adapter 2126 communicates with the other components of information processing system 2102 via the bus 2108. Other hardware and/or software components can also be used in conjunction with the information processing system 2102. Examples include, but are not limited to: microcode, device drivers, redundant processing units, external disk drive arrays, RAID systems, tape drives, and data archival storage systems.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a solid state drive (SSD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Javascript, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A multi-channel collaborative visual analytics system for coordinating collaborative data exploration comprising:
a central collaborative visual analytics (CVA) server comprising a plurality of local channels, a global channel, and a playback editor that rearranges a presentation order of recorded state change event data; and
a plurality of client devices, each client device including a display presenting at least one user-selectable visual analytic of a plurality of visual analytics, each visual analytic representing a different display mode of a currently running distributed-web-connected application and coupled to one or more local channels of the central CVA server by one or more WebSockets, each client device further communicating state change event data of the distributed-web-connected application to the central CVA server, the state change event data including changes to at least one of applied filters, formatting and content displayed using the distributed-web-connected application;
the central CVA server managing both real-time delivery and recorded playback of the state change events for the plurality of client devices; and
at least one of the client devices:
temporarily halts delivery from the at least one client device of the state changing events of the distributed web application; and
while the delivery is temporarily halted, receives an indication when another client device has delivered state changing events to the central CVA server.

2. The system of claim 1, further comprising a persistent store, communicatively coupled to the central CVA server, the persistent store storing the state change events from the plurality of client devices for deferred playback.

3. The system of claim 1, wherein the at least one client device application is no longer in sync with other client devices, the at least one client device re-syncs to a same state as at least one other client device.

4. The system of claim 1 wherein the at least one client device application is no longer in sync with other client devices, the at least one client device notifies other client devices for synchronization with the at least one client device.

5. The system of claim 2, wherein the state change event data is maintained in a consistent state based on state changing events.

6. The system of claim 1, wherein at least one of the client devices imposes a change on a display of a different client device.

7. The system of claim 1, wherein at least one of the client devices imposes a change of a different client device data state.

8. The system of claim 1, wherein the global channel receives the state change event data communicated over all local channels.

9. The system of claim 1, wherein the WebSockets are HTML5 WebSockets.

10. The system of claim 1, wherein each of the plurality of client devices comprises a plurality of visual analytics, each visual analytic representing a different display mode of the distributed-web-connected application.

11. A method of coordinating collaborative data exploration on a multi-channel collaborative visual analytics system comprising:
receiving, at a central collaborative visual analytics (CVA) server, state change event data of a currently running distributed-web-connected application, from at least one client device of a plurality of client devices connected to the CVA server via one or more local channels using one or more WebSockets, the state change event data including changes to at least one of applied filters, formatting and content displayed using a client device;
storing the state change event data on a persistent store for deferred playback; and
communicating the state change event data to at least one other client device of the plurality of client devices;
presenting, on a display of the at least one other client device, the state change event data in at least one user-selectable visual analytic of a plurality of visual analytics, each visual analytic representing a different display mode of a currently running distributed-web-connected application;
rearranging a presentation order of recorded state change event data;
receiving a request to temporarily halt delivery of state change event data from at least one client device; and
responsive to receiving the request:
temporarily halting delivery of state change event data from the at least one client device; and
while the delivery is temporarily halted, receiving, at the at least one client device, an indication when another client device has delivered state changing events to the central CVA server.

12. The method of claim 11, wherein the at least one client device includes an application no longer in sync with other client devices, the method further comprises receiving a request to re-sync the at least one client device to a same state as at least one other client device.

13. The method of claim 11, wherein the at least one client device includes an application no longer in sync with other client devices, the method further comprises notifying other client devices for synchronization with the at least one client device.

14. The method of claim 11, wherein the global channel receives the state change event data communicated over all local channels.

15. A computer program product for coordinating collaborative data exploration on a multi-channel collaborative visual analytics system, the computer program product comprising:
a non-transitory storage medium readable by a processing circuit and storing instructions for execution by the processing circuit for performing a method comprising:
receiving, at a central collaborative visual analytics (CVA) server, state change event data of a currently running distributed-web-connected application from at least one client device of a plurality of client devices connected to the CVA server via one or more local channels using one or more WebSockets, the state change event data including changes to at least one of applied filters, formatting and content displayed using a client device;
storing the state change event data on a persistent store for deferred playback; and
communicating the state change event data to at least one other client device of the plurality of client devices;

presenting, on a display of the at least one other client device, the state change event data in at least one user-selectable visual analytic of a plurality of visual analytics, each visual analytic representing a different display mode of a currently running distributed-web-connected application;

rearranging a presentation order of recorded state change event data;

receiving a request to temporarily halt delivery of state change event data from at least one client device; and responsive to receiving the request:

temporarily halting delivery of state change event data from the at least one client device; and while the delivery is temporarily halted, receiving, at the at least one client device, an indication when another client device has delivered state changing events to the central CVA server.

* * * * *